(12) United States Patent
Emmoft et al.

(10) Patent No.: US 6,424,845 B1
(45) Date of Patent: Jul. 23, 2002

(54) PORTABLE COMMUNICATION DEVICE

(75) Inventors: Stephen J. Emmoft; Sarah Woods, both of London; Graham I. Johnson, Fife, all of (DE)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/335,804

(22) Filed: Jun. 17, 1999

(30) Foreign Application Priority Data

Jun. 19, 1998 (GB) ............................................. 9813155
Sep. 14, 1998 (GB) ............................................. 9819935

(51) Int. Cl.⁷ .............................................. H04B 1/38
(52) U.S. Cl. ......................... 455/575; 455/550; 455/558
(58) Field of Search ................................ 455/575, 550, 455/558, 31.3, 458, 412, 414; 370/346; 340/825.44

(56) References Cited

U.S. PATENT DOCUMENTS

| | | |
|---|---|---|
| 4,570,688 A | 2/1986 | Williams |
| 4,928,000 A | 5/1990 | Eglise et al. |
| 5,020,105 A | 5/1991 | Rosen et al. |
| 5,208,745 A | 5/1993 | Quentin et al. |
| 5,215,237 A | 6/1993 | Wu |
| 5,221,838 A | 6/1993 | Gutman et al. |
| 5,351,294 A * | 9/1994 | Matsumoto et al. .......... 380/23 |
| 5,469,506 A | 11/1995 | Berson et al. |
| 5,485,520 A | 1/1996 | Chaum et al. |
| 5,498,859 A | 3/1996 | Farmont |
| 5,514,862 A | 5/1996 | Salzano |
| 5,526,233 A | 6/1996 | Hayakawa |
| 5,714,741 A * | 2/1998 | Pieterse et al. ............. 235/380 |
| 5,748,737 A | 5/1998 | Daggar |
| 5,763,862 A | 6/1998 | Jachimowicz et al. |
| 5,796,832 A | 8/1998 | Kawan ......................... 380/24 |
| 5,821,513 A * | 10/1998 | O'Hagan et al. ........... 235/383 |

(List continued on next page.)

FOREIGN PATENT DOCUMENTS

| | | | |
|---|---|---|---|
| DE | 4125198 | 5/1992 | ............ G07C/9/00 |
| DE | 9304488 | 9/1993 | |
| DE | WO 97/45814 | * 12/1997 | ............ G07F/7/08 |
| EP | 0379333 | 7/1990 | ............ G07F/7/10 |
| EP | 0793205 | 9/1997 | ............ G07F/7/08 |
| EP | 0798650 | 10/1997 | |
| EP | 08925546 | 2/1998 | ............ G07K/7/10 |
| EP | 0843290 | 5/1998 | |
| FR | 2749424 | 12/1997 | |
| FR | 2752317 | 2/1998 | |
| GB | 2308001 | 6/1997 | ............ G06K/7/00 |
| JP | 241020 | of 1997 | ............ G07F/7/08 |
| WO | 9211598 | 7/1992 | ............ G06F/15/16 |
| WO | 9504328 | 2/1995 | ............ G06K/19/07 |
| WO | 9520195 | 7/1995 | ............ G06F/15/30 |
| WO | 9632700 | 10/1996 | ............ G06F/7/08 |
| WO | 9741499 | 11/1997 | |
| WO | 9745814 | 12/1997 | ............ G07F/7/10 |
| WO | 9811750 | 3/1998 | |
| WO | 9812674 | 3/1998 | ............ G07F/7/08 |

OTHER PUBLICATIONS

Lange et al., "It's now at our fingertips . . .", Electronic Engineering Times, n 946, p 142, Mar. 24, 1997, Journal ISSN: 0192–1541 (Unitd States),.

*Primary Examiner*—Daniel Hunter
*Assistant Examiner*—Charles Chow
(74) *Attorney, Agent, or Firm*—Gregory A. Welte

(57) ABSTRACT

The present invention relates to a portable communication device. The communication device comprises a housing which accommodates a number of components enabling the user to effect two-way communications including data transfer and personal communications. The components include a selectively operable smart card sensor, a display device, a mobile electronic data communications facility to receive and transmit data communications, and a data transaction processing means in data communication with the smart card sensor, the display device and the data communications facility.

13 Claims, 2 Drawing Sheets

U.S. PATENT DOCUMENTS

| | | | |
|---|---|---|---|
| 5,828,311 A | * | 10/1998 | Ostlund ................. 340/825.44 |
| 5,867,795 A | * | 2/1999 | Novis et al. ................. 455/566 |
| 5,936,220 A | | 8/1999 | Hoshino et al. |
| 5,945,652 A | | 8/1999 | Ohki et al. |
| 5,970,389 A | * | 10/1999 | Lewiner et al. ............ 455/31.2 |
| 5,983,073 A | | 11/1999 | Ditzik |
| 6,010,067 A | | 1/2000 | Elbaum |
| 6,016,476 A | | 1/2000 | Maes et al. |
| 6,016,955 A | | 1/2000 | De Rooij et al. |
| 6,038,295 A | | 3/2000 | Mattes |
| 6,065,674 A | | 5/2000 | Shriver |
| 6,085,177 A | | 7/2000 | Semple et al. |
| 6,089,459 A | | 7/2000 | Eisele et al. |
| 6,105,008 A | | 8/2000 | Davis et al. |
| 6,111,977 A | | 8/2000 | Scott et al. |
| 6,112,984 A | | 9/2000 | Snavely |
| 6,122,625 A | | 9/2000 | Rosen |
| 6,230,148 B1 | | 5/2001 | Pare, Jr. et al. |
| 6,256,616 B1 | | 7/2001 | Brookner .................... 705/401 |

* cited by examiner

1

PORTABLE COMMUNICATION DEVICE

BACKGROUND OF THE INVENTION

The present invention relates to a portable communication device. The communication device comprises a housing which accommodates a number of components enabling the user to effect two-way communications including data transfer and personal communications.

The wallet or purse is the traditional and familiar means to hold cash and other everyday objects about the person. Other devices such as credit cards and smart cards have broadened the range of personal financial transactions so that a choice can be made to transact purchases and make other financial transactions either with cash held in the wallet or purse or electronically through retail point-of-sale terminals or automated teller machines. An even wider range of transactions has become commonplace through the advent of telephone banking whereby telephone or personal computer instructions to the relevant institution can be communicated for financial transfers and the purchase of services.

The variety of means to manage money has thus expanded so that the individual user is faced with a mass of different, often technologically complex devices and interfaces for communication and transaction in different contexts such as within the home, on the move or at work. The user is also faced with an increasing diversity of information from advertisers, banks and retailers which may affect the management of financial affairs.

SUMMARY OF THE INVENTION

It is the aim of the present invention to provide a portable communication device which provides the user with improved communications facilities.

According to the present invention, there is now provided a portable communication device comprising a housing incorporating;

- at least one selectively operable smart card sensor,
- a display device,
- a mobile electronic data communications facility to receive and transmit data communications, and
- a data transaction processing means in data communication with the smart card sensor, the display device and the data communications facility.

The selectively operable smart card sensor may incorporate a switch engageable by the user. The switch is preferably located to be operable through the intermediary of pressure applied to flex a smart card held by the sensor.

BRIEF DESCRIPTION OF THE DRAWINGS

The invention will now be described, by way of example, with reference to the accompanying drawings in which.

DETAILED DESCRIPTION

Figure 1:
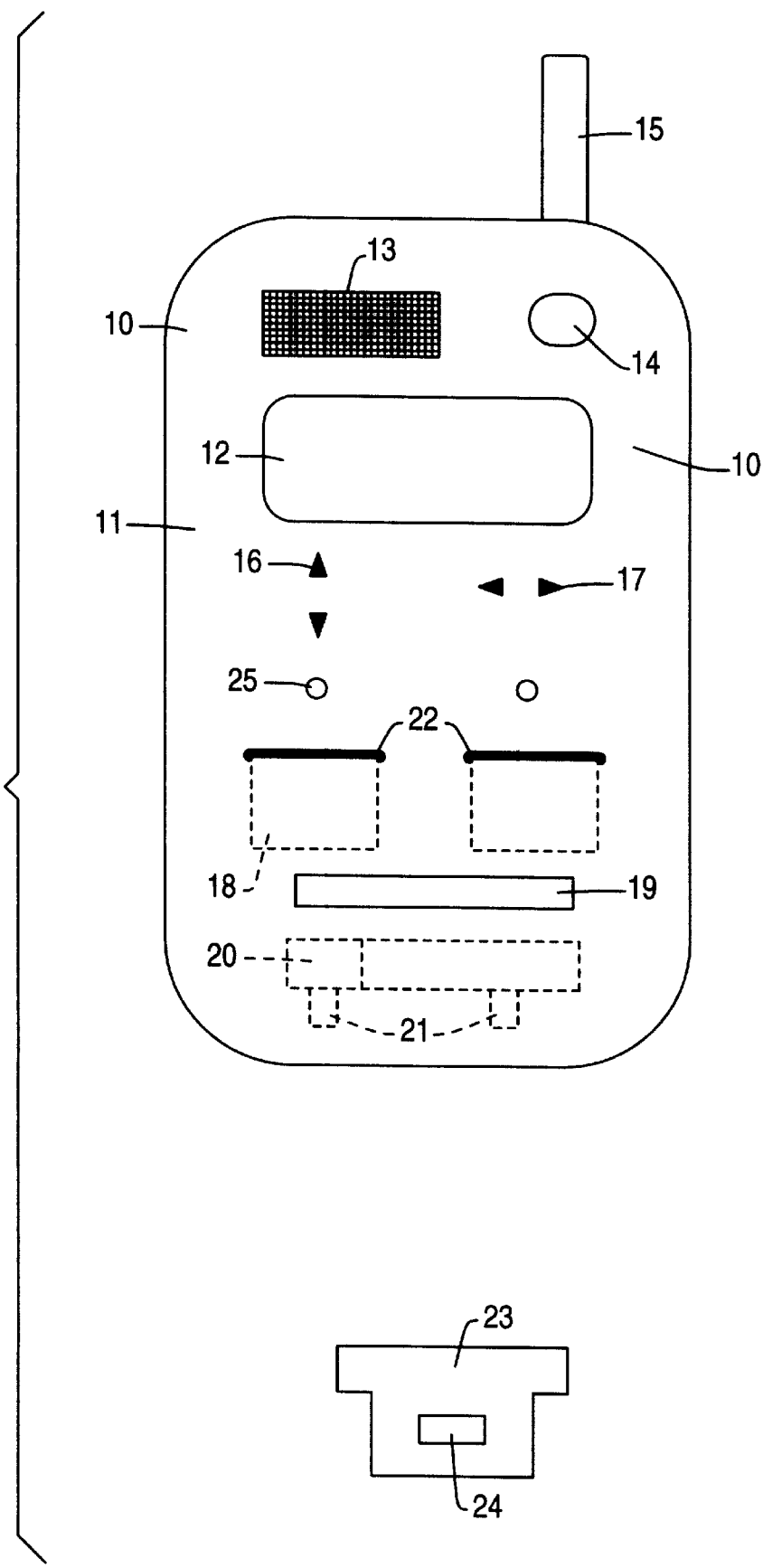
FIG. 1 shows a portable communication device incorporating the present invention.

Referring now to FIG. 1, there is shown a portable, hand-held communication device 10 comprising an outer casing 11. A liquid crystal display 12 is mounted on a front face of the casing 11. Above the display 12, as seen in FIG. 1, are arranged a microphone/loudspeaker 13, a user recognition device 14 and an antenna 15. Below the display 12 are arranged vertical cursor control controls 16 and horizontal cursor controls 17 to control a cursor displayed on the display device as will be explained. The device 10 also has a pair of smart card sensors 18, a paging control 19, and a transaction processor 20. Data communication ports 21 allow external data communication to the data processor 20. The transaction processor 20 and the ports 21 are shown diagrammatically in dotted lines in FIG. 1 because they are disposed within the interior of the casing 11.

Each of the smart card sensors 18 includes a receiving slot 22 to receive a smart card and hold the smart card in an operating position for data communication with sensor contacts within the smart card sensor. An example of a smart card 23 useable with the sensors 18 is shown alongside the device 10. The smart card is generally T-shaped and carries a semiconductor chip 24 which has contacts for engagement with the smart card sensor contacts in the device 10. An operating switch 25 is mounted above each sensor 18 to be overlaid by the cross-bar of the T-shaped smart card when in use. The switch 25 is operable in response to pressure applied by a user of the device 10 to flex the smart card into engagement with the switch 25. The switch is then operated by the pressure applied through the intermediary of the flexed smart card held by the sensor. The number of smart card sensors 18 is a matter of design choice. Although only two such sensors have been shown, there may be any convenient number other than two.

The cross-bar of the T-shaped smart card 23 is wider than the entry slot 22 of either smart card sensor 18. The cross-bar therefore acts as an abutment to register the smart card 23 precisely in relation to the sensor contacts within the smart card sensor 18 upon entry of the smart card into the slot 22. Whilst a T-shaped smart card is to be preferred, other shapes may be used to provide a suitable abutment to register the smart card in the sensor 18 and to overlay the switch 25. For example the cross-bar of the smart card may be replaced by a tongue of circular or elliptical shape.

Figure 3:
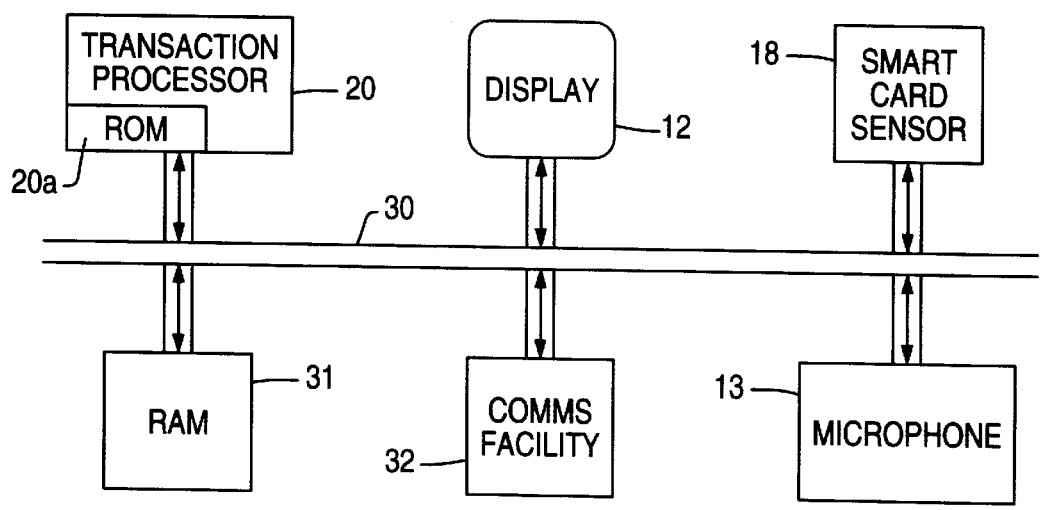
FIG. 3 shows a block circuit diagram of components accommodated within the communication device of FIG. 1.

Referring to FIG. 3, the transaction processor 20 is shown to incorporate a read-only memory 20a. The transaction processor is connected through a data bus 30 to the liquid crystal display 12, the smart card sensors 18, a random access memory 31, an electronic mobile communications facility 32 and the microphone 13. The electronic mobile communications facility incorporates the antenna 15.

Figure 2:
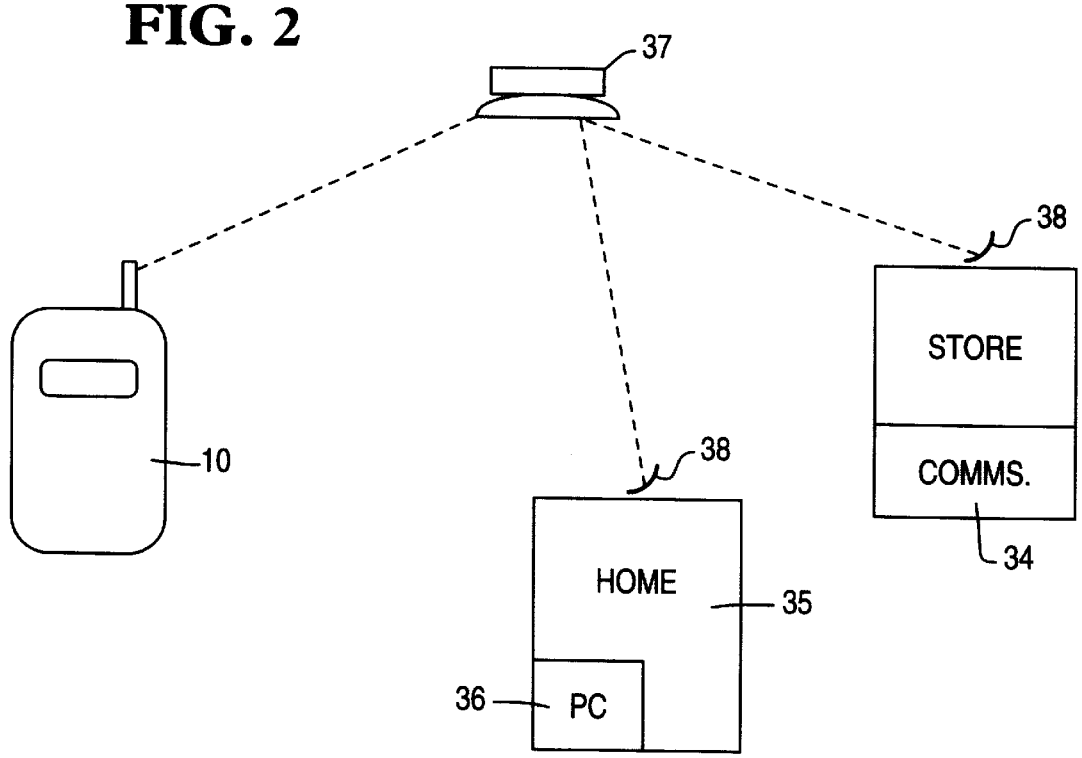
FIG. 2 is a block diagram of an electronic network including a network site constituted by the device of FIG. 1.

In FIG. 2, the device 10 is shown in operation as one site of an electronic communications network. Other sites include a retail store 33 including a communications centre 34 and a home building 35 including a personal computer 36. The communications network is shown diagrammatically to include a satellite 37 which provides a link to satellite dishes 38 provided on the buildings 33 and 35. It will be understood by those skilled in the art of electronic communications that the network is capable of transmitting data to be relayed over the public switched networks with additional links to the internet for e-mail communications.

In operation, a user can operate the paging control 19 to gain access to the data communications network. The recognition device 14 is a biometric device which responds to the requested access and operates by reference to an image of the iris of the authorized user. The authorized image is stored by the transaction processor. When an attempt is made to use the device 10, a comparison is made between the stored image and the iris of the user attempting to use the device 10. If there is a match between the iris of the user and the stored image, the transaction processor 20 is enabled and a message informing the user of this is displayed on the display screen 12. If there is no match, the transaction processor 20 is shut down.

It will be apparent to those skilled in the art that the biometric recognition device 14 may take a form other than an iris recognition device. One such alternative form is a biometric recognition device in which recognition is made of the fingerprint of the authorized user.

Upon recognition of the user, the transaction processor 20 is programmed by means of programs stored in the ROM 20a to display to the user a menu of options on the screen 12. The options enable mobile electronic banking and communication, electronic commerce, personal communication, data transfer and computing operations as will be explained.

In a first option, the user may select a banking operation which involves the use of a smart card 23 inserted in one of the smart card readers 18. The smart card reader 18 is switched on by pressure on the smart card 23 which flexes into engagement with the switch 25. The smart card communicates via the data bus 30 with the transaction processor 20 to signal the selection of the chosen smart card 23 and to transfer data from the smart card to the RAM 31 under the control of the transaction processor 20. The data in the RAM 31 includes encrypted information which is accessed by the transaction processor 20 and subject to decryption by means of a decryption program stored in the ROM 20a. The decrypted information may include financial information such as the balance of currency stored in the smart card. The financial information is displayed to the user on the screen 12 so that the user may be informed of the balance stored on the smart card.

In the event that the user chooses to increase the balance of currency stored on the smart card 23, the user may opt to select this option from the display on the screen 12. The option is selected by moving a screen cursor to the location where that option is displayed under the control of the cursor controls 16 and 17. The selection of the option is communicated via the data bus 30 to the transaction processor 20 which is programmed to send data to activate the mobile communications facility 32. The communications facility 32 is activated to communicate a message over the network illustrated in FIG. 2. The message may be addressed to a bank to dispense currency of a value selected from the screen 12 by the user. The bank dispenses the requested currency value by sending a return message to the facility 32 for entry into the RAM 31 under the control of the transaction processor 20. The value of any dispensed currency is deducted from the balance of an account held by the user. The dispensed currency is communicated from the RAM 31 to the smart card reader 18 via the data bus 30 to be entered into the smart card 23.

From the above explanation, it will be seen that the device 10 can be used as a digital wallet in which the currency value stored in one or more of the smart cards 23 can be increased because the display device 12 is user operable to communicate financial transaction instructions to the transaction processing means 20, and the data transaction processing means 20 is programmed to respond to the user instructions to effect financial transfers between the smart card reader 18 and the data communications facility 32.

The cash stored electronically in the smart cards 23 can be used to make purchases electronically. In this case, the user may choose an option from the screen 12 to make a purchase using a card 23 entered into a selected card reader 18. The different card readers 18 may hold smart cards which correspond to individual retailers. For example one smart card reader 18 may hold a smart card 23 individual to a food store and another may hold a smart card 23 individual to an automobile fuel station. The choice of smart card reader is made by the user by pressing a smart card to activate the corresponding switch 25. The display screen 12 and cursor controls 16 and 17 enable the user to enter the data relevant to the purchase. The purchase is communicated electronically by way of the communications facility 32 over the network to the retailer or service provider from whom the purchase is being made. A return message from the retailer or service provider acknowledging the purchase is entered into the RAM 31 and the transaction processor 20 responds to this return message by sending data via the bus 30 to the smart card reader 18 to deduct the purchase amount from the smart card 23 in the reader 18.

The ROM 20a stores an identity code or call sign which is individual to the device 10 and which distinguishes it from other such devices. m the communications network shown in FIG. 2, the retail store 33 has a communications centre 34 which also stores the identity code or call sign for a multiplicity of portable communication devices each as constituted by the device 10 of FIG. 1. The communications centre 34 has the capability of transmitting call signs for the multiplicity of devices 10. The call signs are transmitted continually by the retail store 33 to be received over an area in proximity to the store 33. As a user carrying one of the devices 10 nears the retail store, the device 10 picks up the call signs through the antenna 15. The call signs from the retail store include an identifier to indicate that the source of the call signs is the retail store.

The transaction processor 20 is programmed to recognize an incoming signal as a call sign and is also programmed to compare the incoming call sign with the call sign in the ROM 20a. When the incoming call sign matches that stored in the ROM 20a, the transaction processor deciphers the identifier to register that the call signs emanated from the retail store and places an answering message on the bus 30 which is transmitted by the communications facility 32 as an outgoing message to be received by the communications centre 34. The answering message advises the communications centre that the device 10 is in the vicinity of the retail store 33. The communications centre 34 responds to the message from the device by sending personalized data to the device 10 preceded by the call sign for the device. The personalized data may include a welcome message, updating information about purchases available at a discount price and credit facilities available to the user. The user is informed through the display 12 that communication has been established with the particular retail store identified by the call sign and that a purchase may be made from the store using the smart card 23 corresponding to that store.

The microphone 13 is provided to widen the communication capability of the device 10. The microphone incorporates an analog to digital conversion circuit so as to enable digital information to pass via the data bus 30 to the transaction processor 20. The transaction processor 20 has a speech recognition program capable of converting the microphone input into a text output for display on the screen 12 and for communication to the communications facility 32. The user may select an option from the screen 12 to compose a message to be sent via the communications facility 32. The message may, for example consist of a paging message or may be an e-mail message. The selection of the message option through the screen 12 is communicated to the transaction processor 20 via the data bus 30. In response, the transaction processor requests the user via the screen 12 to enter the message through the microphone 13. The transaction processor 20 receives the digital form of the message via the data bus 30 and is programmed to store the message in the RAM 31. The transaction processor converts the digital data in the RAM 31 to text data which is supplied by way of the bus 30 to be displayed on the screen 12. The user is requested to confirm or cancel the displayed message. If the message is confirmed, the transaction processor 20 controls the communication facility 32 to receive the text data from the bus 30 and to transmit the message over the appropriate mobile communications network.

In the communications network shown in FIG. 2, the home building 35 includes a personal computer 36 with a home communications centre. The home communications centre is loaded with the call sign of a user device 10 and is adapted to transmit the call sign continually in an area within the vicinity of the home building. The call sign transmitted from the home communications centre includes an identifier to indicate that the source of the call sign is the home communications centre. Once the user has reached the proximity of the home building, the device 10 matches the call sign transmitted from the home building to the call sign stored in the ROM 20a in the manner already described above. The response of the transaction processor 20 is to recognize that the call sign is form the home communications centre and to formulate an answer message which interrogates the personal computer 36. The personal computer is programmed to respond with a transmission of personal information to the device 10. Such information may include a welcome message, recorded telephone messages and paging information. The personal computer 36 is linked to a public switched network for the purpose of taking and recording messages received while the user is away from the home building 35.

Request messages can also be transmitted from the device 10 to request information from information servers to be displayed on the screen 12 or to be downloaded onto a smart card 19. The downloaded information may, for example, be of sporting results, financial share information, music or any other material which can conveniently be transmitted and received for storage in a smart card. Intelligent agent programs may be stored by the transaction processor 20 or accessed by a request message transmitted from the device 10 by the user. Such intelligent agent programs may be used to search for material to be transmitted back or may be used to filter material which is transmitted back.

What is claimed is:

1. A method or transmitting advertising information to a prospective customer, comprising the following steps;
    a) transmitting a generalized message to all customers within an area outside a retail store, but in a vicinity of the retail store;
    b) receiving replies from transmitters carried by customers, which replies identify the customers; and
    c) transmitting different advertising messages to at least two respective customers, in response to the replies.

2. Method according to claim 1, wherein said advertising messages containing one or more of the following:
    i) descriptions of merchandise for sale;
    ii) descriptions of purchases available at discount prices; and
    iii) credit facilities available to the customers.

3. Method according to claim 1, wherein the device further comprises apparatus for making payment for a purchase in a wireless manner.

4. Method according to claim 1, wherein the device further comprises a smart card reader.

5. Method according to claim 1, wherein the device further comprises apparatus for making a biometric identification of a person.

6. A method of transmitting information to prospective customers, comprising the following steps:
    a) transmitting call signs by radio from a retail store, each of which identifies a prospective customer;
    b) receiving responses by radio from devices carried by customers located outside the retail store, which responses
        i) respond to the call signs, and
        ii) identify the customers; and
    c) in reply to the responses, transmitting multiple different messages, each accompanied by a call sign identifying a customer.

7. Method according to claim 6, wherein the device further comprises apparatus for making payment for a purchase in a wireless manner.

8. Method according to claim 6, wherein the device further comprises a smart card reader.

9. Method according to claim 6, wherein the device further comprises apparatus for making a biometric identification of a person.

10. A method of interacting with customers who are equipped with portable devices, which the customers carry from their homes to various retail establishment, each device containing
    (1) a call sign which distinguishes it from other of the portable devices, and
    (2) means for
        A) receiving a group of call signs from a retail store,
        B) detecting the device's own call sign within the group, and
        C) transmitting a reply in response to the detected call sign, which reply advises tile retail store that the device is within the vicinity of the retail store; the method comprising:
    a) broadcasting a group of call signs in the vicinity of the retail location;
    b) when a first of said replies is received from a portable device, transmitting a message together with the call sign of the device making the reply; and
    c) when a second, different, of said replies is; received, transmitting a second, different message together with the call sign of the second device making the second reply.

11. Method according to claim 10, wherein the device further comprises apparatus for making payment for a purchase in a wireless manner.

12. Method according to claim 10, wherein the device further comprises a smart card reader.

13. Method according to claim 10, wherein the device further comprises apparatus for making a biometric identification of a person.

* * * * *

UNITED STATES PATENT AND TRADEMARK OFFICE
CERTIFICATE OF CORRECTION

PATENT NO. : 6,424,845 B1
DATED : July 23, 2002
INVENTOR(S) : Stephen J. Emmott et al.

It is certified that error appears in the above-identified patent and that said Letters Patent is hereby corrected as shown below:

Title page,
Item [12], "Emmoft et al." should be -- Emmott et al. --.
Item [75], "Inventors: Stephen J. Emmoft; Sarah Woods, both of London; Graham I. Johnson, Fife, all of (DE)" should be -- Inventors: Stephen J. Emmott; Sarah Woods, both of London; Graham I. Johnson, Fife, all of (GB) --.

Column 6,
Line 40, delete "tile" insert -- the --.

Signed and Sealed this

Twenty-ninth Day of October, 2002

*Attest:*

JAMES E. ROGAN
*Attesting Officer*           *Director of the United States Patent and Trademark Office*